March 17, 1942.   E. K. BENEDEK   2,276,368
LUBRICATION OF RADIAL PUMPS OR MOTORS
Filed Oct. 17, 1940   3 Sheets-Sheet 1
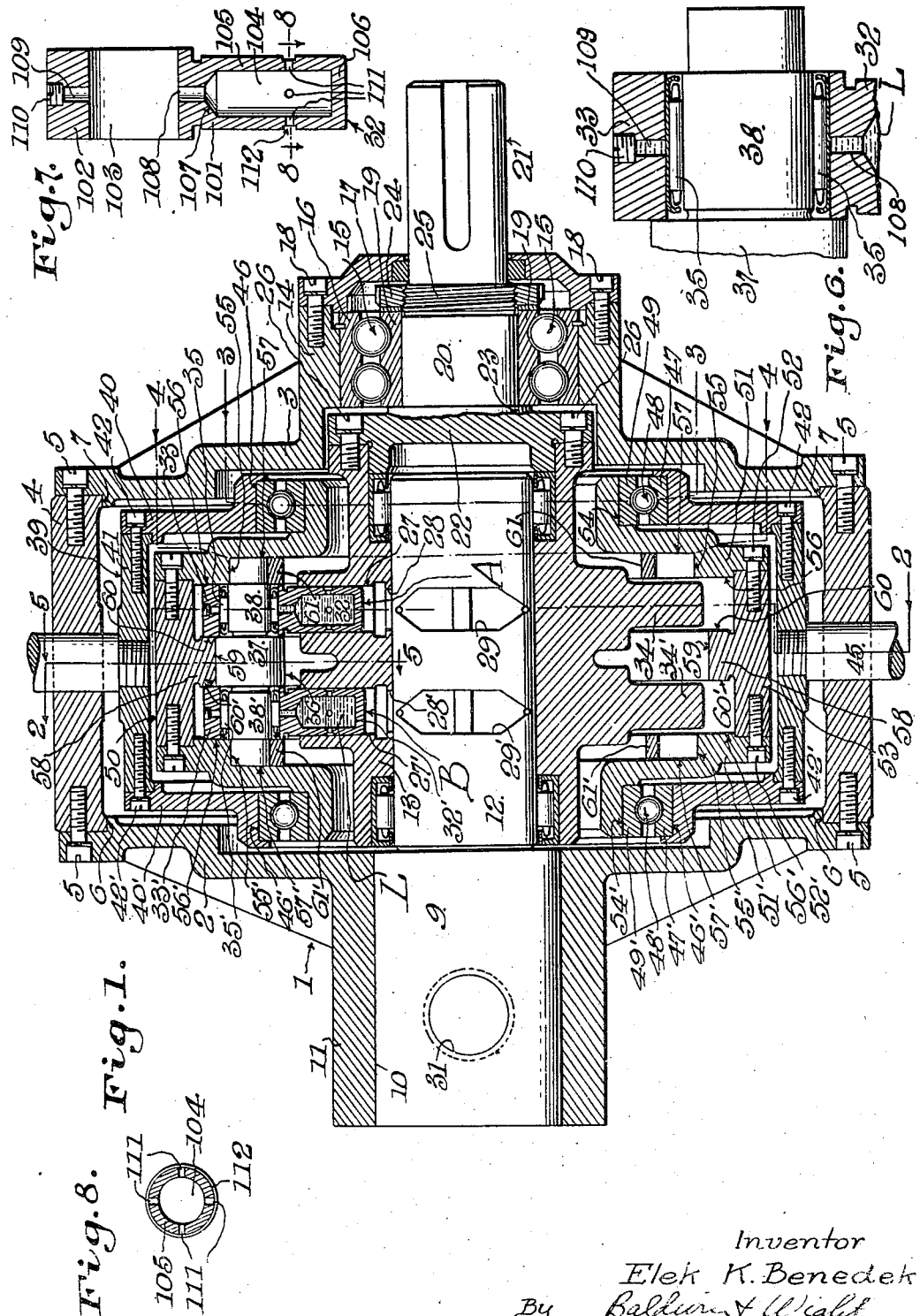
Inventor
Elek K. Benedek
By Baldwin & Wight
his Attorneys

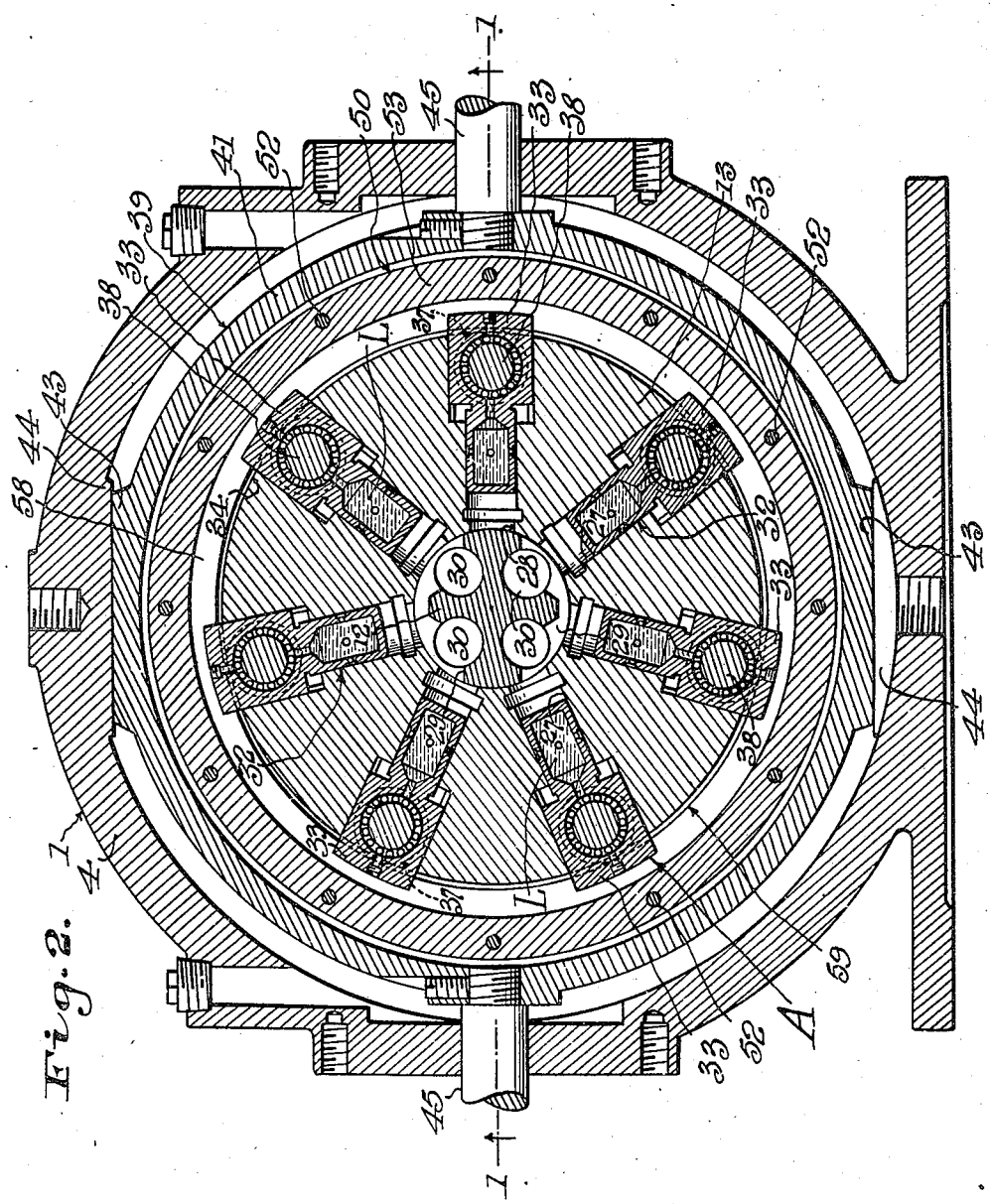

March 17, 1942.  E. K. BENEDEK  2,276,368
LUBRICATION OF RADIAL PUMPS OR MOTORS
Filed Oct. 17, 1940   3 Sheets-Sheet 3
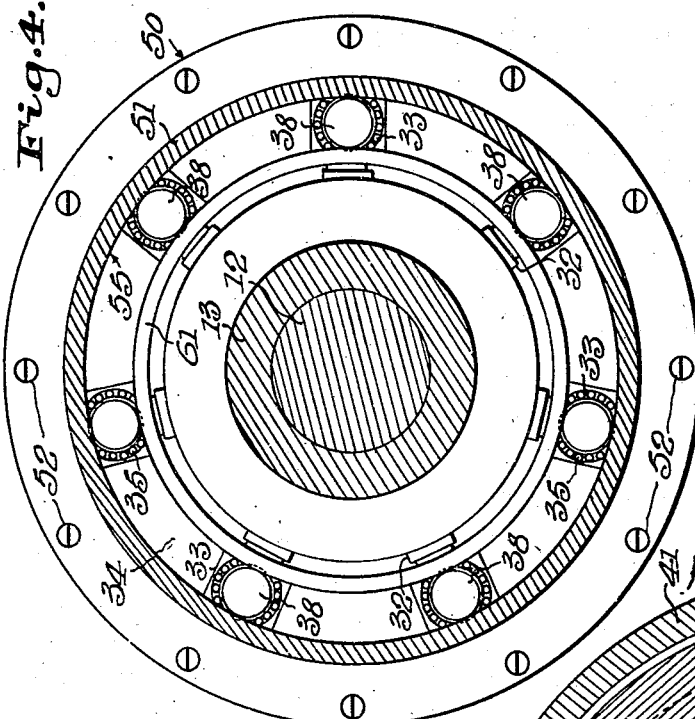
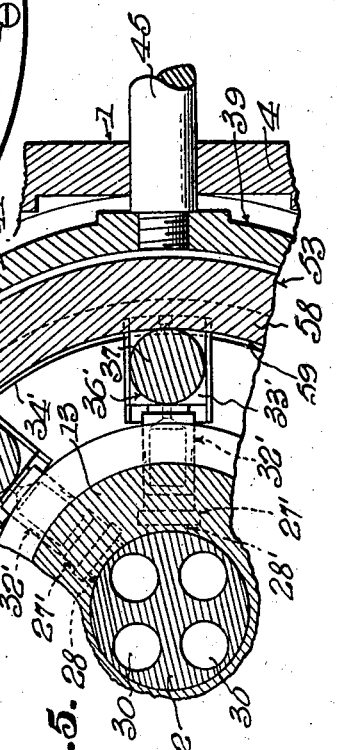
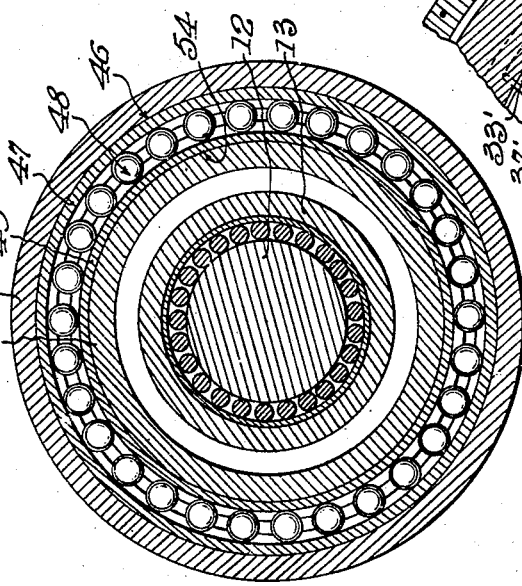
Inventor
Elek K. Benedek
By Baldwin & Wight
Attorneys Patented Mar. 17, 1942

2,276,368

UNITED STATES PATENT OFFICE 2,276,368

LUBRICATION OF RADIAL PUMPS OR MOTORS

Elek K. Benedek, Cleveland, Ohio, assignor, by mesne assignments, to Midland Machine Corporation, a corporation of Illinois Application October 17, 1940, Serial No. 361,643

18 Claims. (Cl. 103—161)

This invention relates to lubrication of hydraulic pumps or motors, and more particularly to the lubrication of pistons and cylinders and thrust-transmitting bearings of pumps or motors of the kind including a plurality of radially disposed, circumferentially spaced piston and cylinder assemblies. Machines of the kind referred to, in general, comprise a stationary pintle provided with fluid transfer passages or conduits, a cylinder barrel rotatable about the pintle and being formed with a plurality of radially disposed, circumferentially spaced cylinders adapted to have valved communication with the pintle conduits, pistons in the cylinders, and means for effecting reciprocation of the pistons relatively to the respective cylinders when the cylinder barrel is rotated. Because of the very high pressures encountered in the operation of these machines, both as pumps and as motors, it has been difficult to lubricate the piston thrust bearings and cylinder walls efficiently. This is particularly so in cases where the machine starts after a shut-down period.

An object of the invention is to provide an improved method of lubricating the piston and cylinder walls of pumps or motors of the character referred to.

Another object is to provide an improved method of lubricating piston thrust-transmitting pins of such pumps.

Another object of the invention is to provide a pump or motor of the character referred to in which the equipment for transmitting thrust to effect relative reciprocation between the pistons and cylinders is very efficiently lubricated.

Another object is to provide a machine of the kind referred to in which individual reservoirs of lubricant are maintained respectively in close proximity to and always immediately available for lubrication of the individual thrust-transmitting means associated with each piston and cylinder assembly.

Another object is to provide a machine having such individual lubricant reservoirs and in which the lubricant is subjected to centrifugal force during operation of the machine, so as to supply lubricant under high pressure to the bearing parts.

Another object is to provide for efficient lubrication of the piston and cylinder walls.

A further object is to utilize lubricant under pressure in individual piston chambers or reservoirs for sealing the piston-cylinder space to prevent sucking of air into the cylinder.

Other objects will become apparent from a reading of the following detailed description, the appended claims, and the accompanying drawings, in which:

Figure 1 is a longitudinal, horizontal, sectional view of a pump or motor embodying the invention, the section being taken on the line 1—1 of Figure 2;

Figure 2 is a transverse, vertical, sectional view taken on the line 2—2 of Figure 1;

Figure 3 is a detailed sectional view taken on the line 3—3 of Figure 1;

Figure 4 is another detailed sectional view taken on the line 4—4 of Figure 1;

Figure 5 is a fragmentary vertical sectional view taken on the line 5—5 of Figure 1;

Figure 6 is a fragmentary sectional view of a piston crosshead and thrust-transmitting pin, drawn on an enlarged scale;

Figure 7 is a longitudinal sectional view of a piston taken on the line 2—2 of Figure 1 and drawn on an enlarged scale, the piston only being shown; and Figure 8 is a transverse section of a piston taken on the line 8—8 of Figure 7 and drawn on an enlarged scale.

For the purposes of illustration, I have shown a pump capable of delivering one hundred gallons per minute at twelve hundred revolutions per minute. It comprises two end plate sections 2 and 3 and an intervening ring section 4 secured between the end plate sections by means of screws 5. The opposed inner faces of the peripheral portions of the end plates 2 and 3 are recessed to provide shoulders 6 and 7 which serve accurately to locate the end plates 2 and 3 and the ring member 4 in assembled relation. A hardened stationary pintle 9 has a press fit in a bore 10 formed in an axial hub-like extension 11 of the end plate section 2. The pintle is formed with a reduced diameter portion 12 on which a cylinder barrel 13 is journaled for rotation about the pintle axis. The end plate section 3 is formed with a hub extension 14 in which is mounted an antifriction ball bearing assembly generally designated 15, and the outer race 16 of which is held in place by an end cap 17 secured to the hub portion 14 by screws 18. The inner race 19 of the bearing assembly 15 is mounted on an inner end portion 20 of a drive shaft generally designated 21. At the extreme inner end of the shaft 20 is an enlarged flange 22 providing a shoulder 23 against which the inner ball race 19 is clamped by a nut 24 engaging a threaded portion 25 of the shaft 21. The shaft flange 22 is secured to the cylinder barrel by means of screws 26. The shaft 21 may be used to impart positive driving effort to the cylinder barrel 13 if the machine is to be used as a pump, and may be used to transmit power from the rotating cylinder barrel 13 to external apparatus to be driven when the machine is to be used as a hydraulic motor.

The cylinder barrel is formed with two sets, generally designated A and B, of radially disposed, circumferentially deployed, piston and cylinder assemblies, the sets being spaced longitudinally of the pintle axis. The set A of piston and cylinder assemblies, shown at the right in Figure 1 and also shown in Figure 2, includes a plurality of circumferentially spaced cylinders 27 respectively communicating with ports 28 in turn adapted to have valved communication with cut-outs or ports 29 in the pintle, the ports 29 having constant communication with bored pintle passages 30. The passages 30 communicate with combined inlet and outlet openings on opposite sides of the pintle and one, 31, of which is shown at the left in Figure 1. Pistons 32 are mounted respectively for reciprocation in the cylinders 27. When the cylinder barrel and pistons are rotated, the pistons will be reciprocated relatively to the associated cylinders in a manner to be described later, and the valved intake and discharge of fluid through the opening 31, the passages 30, the cut-out ports 29, and the cylinder end ports 28 will take place in a manner well understood in the art. The other set B of piston and cylinder assemblies is spaced axially to the left (as viewed in Figure 1) of the set A and includes a plurality of cylinders 27' in which pistons 32' are mounted for reciprocation to take in and discharge fluid through end ports 28', pintle cut-out passages 29', the bored pintle passages 30, and the pintle intake and outlet openings 31.

Individual piston and cylinder assemblies of the set A are paired, respectively, in parallelism with individual piston and cylinder assemblies of the set B, and means are provided for reciprocating the paired pistons of the two sets in unison. The pistons 32 of the set A are formed with crossheads 33 mounted to slide in guides formed in a flange 34 integral with the cylinder barrel. Similarly, the pistons 32' of the set B are formed with crossheads 33' slidable in guides formed in a flange 34' integral with the cylinder barrel. The crossheads 33 and 33' of the sets A and B are paired, and are formed, respectively, with bores equipped with elongated roller bearings 35—35' which anti-frictionally mount hardened thrust-transmitting pins 36 each having an enlarged diameter central portion 37 and smaller diameter end portions 38 and 38'.

For transmitting thrust to and reciprocating the pins 36 and the pistons of both sets A and B, reactance means surrounding the piston and cylinder assemblies of both sets A and B is provided with annular tracks engaged by the pins 36 in three zones spaced from each other longitudinally of the pintle axis; and means are provided for mounting the three tracks of the reactance means eccentrically with respect to the pintle axis, so that, as the cylinder barrel, the pistons, and the pins 36 rotate about the pintle axis, the engagement of the pins simultaneously with the three eccentrically disposed tracks will move the pistons in to their respectively associated cylinders. The reactance means includes a shiftable, non-rotating reactance stator 39 comprising end sections 40 and 40' secured to a central ring section 41 by means of screws 42—42'. The ring section 41 is formed with flat pads 43 mounted to slide on pads 44 formed on the inner surface of the casing ring 4 so as to mount the stator 39 for shifting movement to vary its eccentricity with respect to the pintle axis. Rods 45 secured to the central ring section 41 of the stator 39 extend through the casing and are adapted to be connected to suitable handles or mechanism for shifting the stator. It is usual to mount the reactance stator in pumps of this class so that it may shift to vary its eccentricity, and, hence, the rate of discharge of the pump, but it will be understood that the invention may be embodied in rotary radial pumps wherein the reactance stator is mounted in a fixed eccentric position.

The stator end sections 40 and 40' are formed, respectively, with bearing race seats 46 and 46' which respectively receive outer races 47 and 47' of bearing assemblies generally designated 48 and 48', and which assemblies also include inner races 49 and 49' respectively. The bearing assemblies 48 and 48' serve antifrictionally to mount a rotary reactance member 50 comprising end plate sections 51 and 51' secured by screws 52 and 52', respectively, to a hardened central ring section 53. The end sections 51 and 51' are formed with bearing race seats 54—54' in which are received the inner races 49 and 49' of the bearing assemblies 48 and 48'.

The end plate sections 51 and 51' are formed respectively with annular tracks 55 and 55' disposed in the radial planes or zones of the pin ends 38 and 38'. Outwardly beyond the tracks 55 and 55' the end plate sections 51 and 51' are formed, respectively, with outer radial surfaces 56 and 56' which lie alongside and serve to guide the outer portions of the crossheads 33 and 33'. Inwardly of the annular tracks 55 and 55' the end plate sections 51 and 51' are formed, respectively, with inner radial surfaces 57 and 57' which lie alongside the extreme end portions of the pins 36 with working clearance between the radial surfaces and the flat pin ends. The central section 53 of the rotary reactance 50 is formed with an inwardly extending, centrally disposed flange 58 located between the radial planes of the sets A and B. The inner face of the flange 58 constitutes a track 59 upon which the enlarged central portions 37 of the pins 36 are adapted to roll. Opposed, outwardly directed, radial faces 60 and 60' of the track flange 58 lie alongside and respectively guide the outer portions of the piston crossheads 32 and 32'.

When the machine is operated as a pump, the centrifugal force acting on the pins 36, pistons 32 and 32', and associated crossheads tends to move them outwardly with respect to their cylinders so as to perform suction strokes. To assist in this outward movement, and, more particularly, to maintain the pins in engagement with the reactance tracks 59, 55, and 55' when the pump is at rest and while it is being brought up to operating speed, floating return-thrust-transmitting rings 61 and 61' are disposed respectively within the circle defined generally by the outer end portions of the pins 60. The rings 61 and 61' are supported radially solely by their engagement with the pins 36, and are confined against movement longitudinally of the piston by the piston crossheads and the adjacent inner radial surfaces 57 and 57' of the reactance rotor end plate sections 40 and 40'.

In operation, when the reactance stator 39 and the rotary reactance member 50 carried thereby are shifted to be eccentric to the pintle axis, rotation of the cylinder barrel, the pistons of both sets A and B, and the pins will cause the pins to roll in three zones on the tracks 55, 55', and 59; and the pins 36 and the pistons of both sets A and B will be reciprocated radially to effect valved intake and discharge of fluid through the ports and passages previously described.

The pump structure hereinabove described is similar to that disclosed and claimed in the copending application of Elek K. Benedek for Radial pumps or motors, Serial No. 358,911, filed September 28, 1940.

In accordance with my improved method of lubrication the cross pin journals are supplied with fluid kept under pressure generated by centrifugal force. Bodies of lubricant within the pistons are in communication respectively with the pin journals. The piston and cylinder assemblies are rotated at such angular velocity as to create by centrifugal force sufficient fluid pressure in the lubricant bodies to maintain the lubricant under pressure in the journals. Preferably the bodies of lubricant are maintained by fluid slip from the cylinders through the working clearance space between the piston and cylinder walls. Preferably communication of the piston-contained lubricant bodies and the cylinders is restricted to the working clearance between the piston and cylinder walls. According to the invention, the piston and cylinder walls are lubricated, particularly during suction strokes of the pistons by piston-contained bodies of lubricant under pressure due to centrifugal force.

In the preferred apparatus for practicing this method the pistons 32 are formed with internal chambers providing reservoirs for containing lubricant for the cross pin journals, and preferably also for the cylinder walls and the outside piston surfaces. As shown in Figures 1, 2, and 5, each piston 32 comprises a body portion 101 and an outer end portion 102 formed as a crosshead with a bore 103 receiving the bearings 35 for the thrust-transmitting pin 36. Each piston body portion 101 is hollow, being formed with a lubricant chamber or reservoir 104 defined by the piston side wall 105, the closed imperforate piston inner end wall 106, and an outer wall 107 provided at the juncture of the piston body portion 101 and the crosshead 102. A rifle-drilled lubricant passage 108 provides constant communication between the lubricant chamber 104 and the bore 103. The passage 108 may be formed as a continuation of a tool entrance passage 109 drilled in from the extreme outer end of the crosshead and then closed by a plug 110. Intermediate the ends of the piston body 101 and spaced above the inner end of the lubricant chamber 104 is a plurality of rifle-drilled lubricant passages 111 spaced from each other circumferentially around the piston and extending through the piston side wall to provide communication between the lubricant chamber 104 and the clearance space between the piston outer surface and the cylinder inner surface. Preferably, the passages 111 open outwardly into a piston-encircling groove 112 which provides a local enlargement of the clearance space between the piston and cylinder.

The pistons 32' of the set B of piston and cylinder assemblies are similar to the pistons 32 described above, and therefore need not be described in detail.

Before the pump equipped with my improved lubricating means is operated for the first time, the lubricant chambers 104—104' are prefilled with lubricant indicated at L. The lubricant may be introduced either through the passages 108—108' or the passages 111—111' (before insertion of the pistons in the cylinders). As soon as the cylinder barrel and lubricant-prefilled pistons begin to rotate, the lubricant in the chambers 104—104' will be subjected to centrifugal force so as to build up pressure acting outwardly through the passages 108—108' and 111—111' immediately effecting pressure or forced feed lubrication of the thrust-transmitting pins. After the pump has come up to normal operating speed, each pressure stroke of each piston will build up high pressure in the associated cylinder and the small amount of fluid slipping outwardly through the piston and cylinder clearance space will act inwardly through the passages 111—111', tending to build up pressure and maintain a full supply of lubricant within the associated lubricant chambers 104—104'. The very high pressure generated in each cylinder during the inward or pressure stroke of the associated piston will be greater than the centrifugal pressure caused by the rotation of the body of lubricant within the chamber, so that the chamber will be maintained substantially flooded with lubricant at all times. Provision of the grooves 112—112' encircling each piston tends to facilitate entrance of slip fluid into the passages 111—111'

During the suction stroke of each piston the negative pressure in the cylinder will tend to withdraw fluid lubricant from the clearance space between the piston and cylinder, but the positive pressure of the fluid within the associated chamber 104—104' due to centrifugal force will cause fluid to flow outwardly through the passages 111—111' and groove 112—112' so as to prevent the clearance space between the piston and cylinder from being bled of lubricant.

Since the rate of escape of lubricant through the thrust pin journals is limited by the close fit of the bearing parts, lubricant will be maintained under pressure in the pin journals at all times because of the centrifugal force caused by rotation of the body of lubricant within the chamber 104.

When the pump is stopped, the lubricant remains in the chambers 104—104', being unable to leak freely therefrom through the clearance spaces between the pistons and cylinders and being unable to escape freely through the thrust pin journals. Consequently, a full supply of lubricant is available immediately upon the starting of the pump again.

It will be seen that the slip of fluid from the cylinders must first lubricate the piston and cylinder walls before it can flow in through the passages 111—111' to the chambers 104—104'. Due to the relative reciprocation of the pistons and cylinders, those portions of the cylinder walls which never are completely uncovered by the pistons during their outward strokes will be lubricated efficiently by fluid at all times under pressure in the chambers 104—104'. Furthermore, the lubricant in the chambers 104—104' maintains the grooves 112—112' packed with fluid under pressure so as to provide a seal which prevents suction of air into the cylinders, assuring quiet operation. The very efficient lubrication of the piston and cylinder walls and the thrust pin journals makes possible the use of lighter parts than otherwise could be used, thus eliminating a considerable portion of the stresses caused by centrifugal force.

The construction shown herein for the purposes of illustration embodies the invention in its now preferred form, but it will be apparent that changes in the construction and relative arrangement of the parts may be made without departing from the invention as defined in the claims.

I claim:

1. In a radial pump or motor, a rotatable cylinder barrel formed with a plurality of radially extending, circumferentially disposed cylinders; a plurality of pistons reciprocable in said cylinders respectively; a reactance member formed with a reactance track eccentrically surrounding said cylinder barrel axis of rotation; rollers respectively journaled on said pistons and having rolling engagement with said track, said pistons being hollow and respectively having central lubricant chambers defined by walls including the piston side wall, and the piston closed inner end wall, there being lubricant passages respectively extending outwardly from said chambers to the associated roller journals.

2. In a radial pump or motor, a cylinder bodily rotatable about an axis normal to the cylinder axis; a piston reciprocable in the cylinder; a reactance member formed with a reactance track eccentrically surrounding said cylinder axis of rotation; and a roller journaled on the piston and having rolling engagement with said track, said piston having a central lubricant chamber defined by walls including the piston side wall and the piston inner end wall, said piston being provided with a lubricant passage leading from said chamber outwardly to the roller journal.

3. In a radial pump or motor, a cylinder bodily rotatable about an axis normal to the cylinder axis; a piston reciprocable in the cylinder; a reactance member formed with a reactance track eccentrically surrounding said cylinder axis of rotation; and a roller journaled on the piston and having rolling engagement with said track, said piston having a central lubricant chamber defined by walls including the piston side wall and the piston inner end wall, said piston being provided with a lubricant passage leading from said chamber outwardly to the roller journal and a passage leading from said lubricant chamber through said piston side wall to the clearance space between the latter and the inner surface of the cylinder.

4. In a radial pump or motor, a cylinder bodily rotatable about an axis normal to the cylinder axis; a piston reciprocable in the cylinder; a reactance member formed with a reactance track eccentrically surrounding said cylinder axis of rotation; and a roller journaled on the piston and having rolling engagement with said track, said piston having a central lubricant chamber defined by walls including the piston side wall and the piston inner end wall, said piston being provided with a lubricant passage leading from said chamber outwardly to the roller journal and a passage leading from said lubricant chamber through said piston side wall to the clearance space between the latter and the inner surface of the cylinder, the outside of the piston side wall being formed with an encircling groove communicating with said side wall passage.

5. In a radial pump or motor, a cylinder bodily rotatable about an axis normal to the cylinder axis; a piston reciprocable in the cylinder; a reactance member formed with a reactance track eccentrically surrounding said cylinder axis of rotation; and a roller journaled on the piston and having rolling engagement with said track, said piston having a central lubricant chamber defined by walls including the piston side wall and the piston inner end wall, said piston being provided with a lubricant passage leading from said chamber outwardly to the roller journal, and a passage leading from said lubricant chamber through said piston side wall intermediate the ends of the piston to the clearance space between the latter and the inner surface of the cylinder.

6. In a radial pump or motor, a cylinder bodily rotatable about an axis normal to the cylinder axis; a piston reciprocable in the cylinder; a reactance member formed with a reactance track eccentrically surrounding said cylinder axis of rotation; and a roller journaled on the piston and having rolling engagement with said track, said piston having a central lubricant chamber defined by walls including the piston side wall, a closed imperforate piston inner end wall, and a piston outer end wall, said piston being provided with a lubricant passage leading from said chamber outwardly through said piston outer end wall to the roller journal.

7. In a radial pump or motor, a cylinder bodily rotatable about an axis normal to the cylinder axis; a piston reciprocable in the cylinder; means for valving flow of fluid into and out of the inner end portion of the cylinder; a reactance member formed with a reactance track eccentrically surrounding said cylinder axis of rotation; and a roller journaled on the piston and having rolling engagement with said track, said piston having a central lubricant chamber defined by walls including the piston side wall and the piston inner end wall, said piston being provided with a lubricant passage leading from said chamber outwardly to the roller journal.

8. In a radial pump or motor, a cylinder bodily rotatable about an axis normal to the cylinder axis; means for valving flow of fluid into and out of the inner end portion of the cylinder; a piston reciprocable in the cylinder and having an outer portion projecting outwardly beyond the cylinder outer end, a bore in said piston outer portion extending parallel to the cylinder axis of rotation; a reactance track eccentrically surrounding said cylinder axis of rotation; and a roller journaled in said bore and having rolling engagement with said track, the portion of said piston between the inner end of the piston and said bore being formed with a lubricant chamber defined by the piston side wall, the piston inner end wall, and a piston outer end wall constituted by said outwardly projecting piston portion, said piston outer end wall being formed with a lubricant passage leading from said chamber to said bore.

9. In a radial pump or motor, a cylinder bodily rotatable about an axis normal to the cylinder axis; means for valving flow of fluid into and out of the inner end portion of the cylinder; a piston reciprocable in the cylinder and having an outer portion projecting outwardly beyond the cylinder outer end, a bore in said piston outer portion extending parallel to the cylinder axis of rotation; a reactance track eccentrically surrounding said cylinder axis of rotation; and a roller journaled in said bore and having rolling engagement with said track, the portion of said piston between the inner end of the piston and said bore being formed with a lubricant chamber defined by the piston side wall, the piston inner end wall, and a piston outer end wall constituted by said outwardly projecting piston portion, said piston outer end wall being formed with a lubricant passage leading from said chamber to said bore, the piston inner end wall being imperforate, and there being a passage leading from said chamber through the piston side wall to the clearance space between said piston side wall and the cylinder side wall.

10. In a radial pump or motor, a cylinder bodily rotatable about an axis normal to the cylinder axis; means for valving flow of fluid into and out of the inner end portion of the cylinder; a piston reciprocable in the cylinder and having an outer portion projecting outwardly beyond the cylinder outer end, a bore in said piston outer portion extending parallel to the cylinder axis of rotation; a reactance track eccentrically surrounding said cylinder axis of rotation; and a roller journaled in said bore and having rolling engagement with said track, the portion of said piston between the inner end of the piston and said bore being formed with a lubricant chamber defined by the piston side wall, the piston inner end wall, and a piston outer end wall constituted by said outwardly projecting piston portion, said piston outer end wall being formed with a lubricant passage leading from said chamber to said bore, the piston inner end wall being imperforate, and there being a passage leading from said chamber through the piston side wall to the clearance space between said piston side wall and the cylinder side wall, there being a groove providing a local enlargement of the clearance space between the piston and cylinder, and said piston side wall passage being adapted to communicate with said groove.

11. In a radial pump or motor, a cylinder bodily rotatable about an axis normal to the cylinder axis; means for valving flow of fluid into and out of the inner end portion of the cylinder; a piston reciprocable in the cylinder and having an outer portion projecting outwardly beyond the cylinder outer end, a bore in said piston outer portion extending parallel to the cylinder axis of rotation; a reactance track eccentrically surrounding said cylinder axis of rotation; and a roller journaled in said bore and having rolling engagement with said track, the portion of said piston between the inner end of the piston and said bore being formed with a lubricant chamber defined by the piston side wall, the piston inner end wall, and a piston outer end wall constituted by said outwardly projecting piston portion, said piston outer end wall being formed with a lubricant passage leading from said chamber to said bore, the piston inner end wall being imperforate, and there being a plurality of passages circumferentially spaced from each other around the piston axis and extending from said chamber through the piston side wall to the clearance space between the piston side wall and cylinder side wall.

12. In a radial pump or motor, a cylinder bodily rotatable about an axis normal to the cylinder axis; means for valving flow of fluid into and out of the inner end portion of the cylinder; a piston reciprocable in the cylinder and having an outer portion projecting outwardly beyond the cylinder outer end, a bore in said piston outer portion extending parallel to the cylinder axis of rotation; a reactance track eccentrically surrounding said cylinder axis of rotation; and a roller journaled in said bore and having rolling engagement with said track, the portion of said piston between the inner end of the piston and said bore being formed with a lubricant chamber defined by the piston side wall, the piston inner end wall, and a piston outer end wall constituted by said outwardly projecting piston portion, said piston outer end wall being formed with a lubricant passage leading from said chamber to said bore, the piston inner end wall being imperforate, and there being a passage leading from said chamber at a point outwardly beyond the inner end of the chamber through the piston side wall to the clearance space between said piston side wall and the cylinder side wall.

13. In a method of lubricating piston thrust-transmitting cross pins of a hydraulic pump or motor of the rotary radial piston and cylinder type wherein the cross pins are disposed outwardly beyond the associated pistons, maintaining bodies of lubricant within the pistons and in communication with the pin journals respectively, restricting egress of lubricant from said bodies, and rotating the pistons at such angular velocity as to create by centrifugal force sufficient fluid pressure in said bodies to maintain lubricant under pressure in said journals.

14. In a method of lubricating piston thrust-transmitting cross pins of a hydraulic pump or motor of the rotary radial piston and cylinder type wherein the cross pins are disposed outwardly beyond the associated pistons, maintaining bodies of lubricant within the pistons and in communication with the pin journals respectively, restricting communication between the lubricant bodies and the associated cylinders, and rotating the pistons at such angular velocity as to create by centrifugal force sufficient fluid pressure in said bodies to maintain lubricant under pressure in said journals.

15. In a method of lubricating piston thrust-transmitting cross pins of a hydraulic pump or motor of the rotary radial piston and cylinder type wherein the cross pins are disposed outwardly beyond the associated pistons, providing bodies of lubricant within the pistons and in communication with the pin journals respectively, maintaining said bodies substantially undiminished by providing communication between the bodies and the associated cylinders restricted to the working clearance between the piston and cylinder walls, and rotating the pistons at such angular velocity as to create by centrifugal force sufficient fluid pressure in said bodies to maintain lubricant under pressure in said journals.

16. In a method of lubricating piston and cylinder walls of a hydraulic pump or motor of the rotary radial piston and cylinder type, maintaining bodies of lubricant within the pistons in communication with the clearance space between the piston and cylinder walls, and rotating the pistons at such angular velocity as to create by centrifugal force sufficient fluid pressure in said bodies to maintain lubricant under pressure in said clearance spaces during both suction and pressure strokes of the pistons.

17. In a method of lubricating piston and cylinder walls of a hydraulic pump or motor of the rotary radial piston and cylinder type, maintaining bodies of lubricant within the pistons in communication with the clearance space between the piston and cylinder walls and in only restricted communication with the respectively associated cylinders, and rotating the pistons at such angular velocity as to create by centrifugal force sufficient fluid pressure in said bodies to maintain lubricant under pressure in said clearance spaces during both suction and pressure strokes of the pistons.

18. In a method of lubricating piston and cylinder walls of a hydraulic pump or motor of the rotary radial piston and cylinder type, maintaining bodies of lubricant within the pistons in communication with the cylinder solely by way of the clearance space between the piston and cylinder walls, and rotating the pistons at such angular velocity as to create by centrifugal force sufficient fluid pressure in said bodies to maintain lubricant under pressure in said clearance spaces during both suction and pressure strokes of the pistons.

ELEK K. BENEDEK.